United States Patent [19]

Shih et al.

[11] Patent Number: 5,306,795
[45] Date of Patent: Apr. 26, 1994

[54] POLYMERIZATION OF VINYLPYRROLIDONE

[75] Inventors: Jenn S. Shih, Paramus; Terry E. Smith, Morristown, both of N.J.

[73] Assignee: ISP Investments Inc., Wilmington, Del.

[21] Appl. No.: 648,261

[22] Filed: Jan. 31, 1991

[51] Int. Cl.$^5$ ............................ C08F 126/10
[52] U.S. Cl. ................................. 526/264
[58] Field of Search .......................... 526/264

[56] References Cited

U.S. PATENT DOCUMENTS 4,058,655 11/1977 Denzinger et al. ............... 526/264

FOREIGN PATENT DOCUMENTS 668361 12/1965 Belgium .

Primary Examiner—Joseph L. Schofer
Assistant Examiner—Wu C. Cheng

Attorney, Agent, or Firm—Walter Katz; Marilyn J. Maue; Joshua J. Ward

[57] ABSTRACT

What is provided herein is a process for making homopolymers of polyvinylpyrrolidone polymer in the form of fine powders at a polymer solids level of at least about 17%, preferably 30% or more, and in a yield of at least about 95%, which comprises precharging a reactor with a predetermined amount of a solvent selected from a $C_3$-$C_{20}$ alkane, preferably heptane, or a $C_3$-$C_{20}$ cycloalkane, preferably cyclohexane, and a free radical polymerization initiator, and feeding vinylpyrrolidone monomer into the precharged reactor at a selected rate, preferably about 0.1 to 1.8 g vinylpyrrolidone/min/1000 g of solvent, and most preferably, about 1 g/min/1000 g of cyclohexane and 0.5 g/min/1000 g of heptane, which rates preclude build-up of monomer during the polymerization, and for a feed period which provides the desired level of polymer solids in the reaction product, preferably at least about 200 minutes. The polymer product may be isolated from the reaction mixture by filtration and drying, or by direct drying.

12 Claims, No Drawings

POLYMERIZATION OF VINYLPYRROLIDONE

BACKGROUND OF THE INVENTION

1. Field of the Invention

This invention relates to polymerization of vinylpyrrolidone to form polyvinylpyrrolidone polymers, and more particularly, to a precipitation polymerization process for preparing homopolymers of polyvinylpyrrolidone in high yield in the form of fine powders at a high polymer solids level.

2. Description of the Prior Art

Polyvinylpyrrolidone (PVP) can be made by solution, suspension or emulsion polymerization of vinylpyrrolidone monomer in the presence of water or organic solvents. Lorenz and Williams U.S. Pat. No. 4,190,718, for example, disclosed a process for making high molecular weight PVP in heptane by reverse suspension polymerization using suitable suspending agents. Belgium patent 668,368 also described a process for synthesizing copolymers of vinyl lactams in aliphatic hydrocarbon solvents by precipitation polymerization. However, these and other references have failed to provide a commercial process for making homopolymers of polyvinylpyrrolidone in high yield in the form of fine powders at a high polymer solids level.

Accordingly, it is the object of this invention to provide a new and improved process for making homopolymers of polyvinylpyrrolidone in high yield in the form of fine powders at a high polymer solids level.

A particular object herein is to provide homopolymers of polyvinylpyrrolidone in a yield of at least about 95%, as fine powders, preferably at a polymer solids level of at least about 17%, and, most preferably 30% or more.

These and other objects and features of the invention will be made apparent from the following description of the invention.

SUMMARY OF THE INVENTION

What is provided herein is a process for making homopolymers of polyvinylpyrrolidone polymer in the form of fine powders at a polymer solids level of at least about 17%, preferably 30% or more, and in a yield of at least about 95%, which comprises precharging a reactor with a predetermined amount of a solvent selected from a $C_3$-$C_{20}$ alkane, preferably heptane, or a $C_3$-$C_{20}$ cycloalkane, preferably cyclohexane, and a free radical polymerization initiator, and feeding vinylpyrrolidone monomer into the precharged reactor at a selected rate, preferably about 0.1 to 1.8 g vinylpyrrolidone/min/1000 g of solvent, and most preferably, about 1 g/min/1000 g of cyclohexane and 0.5 g/min/1000 g of heptane, which rates preclude build-up of monomer during the polymerization, and for a feed period which provides the desired level of polymer solids in the reaction product, preferably at least about 200 minutes. The polymer product may be isolated from the reaction mixture by filtration and drying, or by direct drying.

DETAILED DESCRIPTION OF THE INVENTION

In accordance with the present invention, a process is provided for making fine powders of homopolymers of polyvinylpyrrolidone at a high solids level and in high yield in which the amount of vinylpyrrolidone monomer in the reaction mixture is controlled to preclude excessive build-up of the monomer therein. The invention is based upon the discovery that free monomer present during the polymerization can cause the formation of a gummy polymer product, and that the absence of excessive build-up of monomer in the reaction mixture will enable the preparation of fine polymer powders in high yield at a very high solids level, suitably at about 17%, and even at 30% or more.

The solvent used herein is a $C_3$-$C_{20}$ alkane, such as heptane, or a $C_3$-$C_{20}$ cycloalkane, such as cyclohexane.

The monomer feeding rate suitably is about 0.1 to 1.8 g monomer/min/1000 g of solvent, preferably about 1 g/min/1000 g of cyclohexane and about 0.5 g/min/1000 g of heptane. At feeding rates higher than about 1.8 g monomer/min/1000 g of solvent, only gummy products are formed, whereas fine powders are obtained within the predetermined suitable feeding rates. Feeding rates slower than 0.1 are impractical. Furthermore, the monomer feed time may be selected to provide a desired high polymer solids level, suitably at least 200 minutes, and generally 3½ to 14 hours, depending upon the predetermined feed rate.

A suitable free radical polymerization initiator is provided during the polymerization, such as t-butylperoxypivalate, t-amylperoxypivalate, dibutylperoxide and the like, although other initiators known in the art may be used as well.

The polymerization reaction is carried out at a suitable temperature, generally about 50°–85° C.

The polymer is precipitated during the polymerization in the form of fine powders which can be isolated by filtration and drying, or by direct drying.

In general, the process of the invention is carried out by the steps of precharging a reactor with the solvent, under agitation, and in a protective blanket of nitrogen, heating the solvent to the polymerization temperature, adding the initiator, and feeding the vinylpyrrolidone monomer therein at the selected rate for a predetermined period of time, and isolating the fine powders produced by filtering and drying, or by direct drying.

The Fikentscher K-value of the polyvinylpyrrolidone polymer obtained is at least 40, generally 45–55.

The invention will now be illustrated by the following specific examples.

EXAMPLE 1

A 2-liter four-necked reaction kettle (bottom radius=5⅛ inches) equipped with a condenser, a constant speed mechanical stirrer at 170 rpm with torque reading and anchor agitator (open radius=4-5/6 inches), one dip tube connected to a metering pump, a nitrogen purge adaptor, and a thermocouple connected to a temperature controller, was charged with 1000 grams of cyclohexane. The reactor then was heated to 65° C. in 30 minutes while purging with nitrogen, held at 65° C. for 30 minutes and 520 microliters of t-butylperoxypivalate (Lupersol 11) was added. Then vinylpyrrolidone was fed into the reactor over a predetermined period of time (see below). Finally 200 microliters of additional t-butylperoxypivalate was charged into the reactor and the reaction mixture, under stirring, was kept overnight at 65° C. Then the contents were cooled to room temperature and filtered. The polymer reaction product was a white powder cake which was dried successively in a hood, in an oven at 100° C., and in a vacuum oven at 90° C. for 16 hours each.

TABLE 1

| VP (g) | Feed Time (hrs) | Feed Rate | (g monomer/ min/1000 g of cyclohexane) Yield % | % Solids | Results | *K-value |
|---|---|---|---|---|---|---|
| 200 | 1 | 3.3 | — | 16.7% | Gummy product | — |
| 200 | 3.5 | 1.0 | 99.5 | 16.7% | Fine powder | 45.3 |
| 430 | 7 | 1.0 | 100 | 30.0% | Fine powder | 53.3 |

*Fikentscher values: 1 g/dl in water at 25° C.

EXAMPLE 2

The procedure of Example 1 was followed using heptane in place of cyclohexane according to the following feeding schedule.

TABLE 2

| VP (g) | Feed Time (hrs) | Feed Rate | (g monomer/min/1000 g of heptane) Yield % | % Solids | Results |
|---|---|---|---|---|---|
| 200 | 1 | 3.3 | — | 16.7% | Gummy product |
| 200 | 6 | 0.5 | 99 | 16.7% | Fine powder |
| 430 | 14 | 0.5 | 97 | 30.0% | Fine powder |

What is claimed is:

1. A precipitation polymerization process for producing homopolymers of polyvinylpyrrolidone in the form of fine powders during polymerization at a solids level of at least about 17% and in a yield of polymer of at least about 95%, which consists essentially of precharging a reactor with a predetermined amount of a solvent selected from a $C_3$–$C_{20}$ alkane and a $C_3$–$C_{20}$ cycloalkane, and a polymerization initiator, and feeding vinylpyrrolidone monomer into said precharged reactor at a selected rate of 0.1 to 1.8 g vinylpyrrolidone/min/1000 g of solvent which precludes excessive build-up of monomer and gumming of polymer during the polymerization during a feed period which provides the desired level of solids in the reaction product.

2. A process according to claim 1 in which said solvent is heptane.

3. A process according to claim 1 in which said solvent is cyclohexane.

4. A process according to claim 1 in which said polymer solids level is at least 30%.

5. A process according to claim 3 in which said vinylpyrrolidone monomer is fed into the precharged reactor at a rate of about 1 g/min/1000 g of cyclohexane.

6. A process according to claim 2 in which said vinylpyrrolidone monomer is fed into the precharged reactor at a rate of about 0.5 g/min/1000 g of heptane.

7. A process according to claim 5 wherein said monomer is fed into the reactor over a period of at least 200 minutes.

8. A process according to claim 6 in which said monomer feed period is at least 200 minutes.

9. A process according to claim 1 wherein said polymerization is carried out at a temperature of about 50°–85° C.

10. A process according to claim 1 wherein said polymerization temperature is about 65° C.

11. A process according to claim wherein the K-value of the polymer is at least 40.

12. A process according to claim 1 in which the precipitated powders are isolated by being filtered and dried, or by direct drying.

* * * * *